United States Patent [19]
Leffel

[11] 3,981,094
[45] Sept. 21, 1976

[54] ARTIFICIAL FISHING BAIT

[76] Inventor: Myron J. Leffel, 114 W. Jefferson St., Marshfield, Wis. 54449

[22] Filed: July 10, 1975

[21] Appl. No.: 594,683

[52] U.S. Cl. ................................................ 43/35
[51] Int. Cl.² ...................................... A01K 85/02
[58] Field of Search ............... 43/37, 35, 34, 42.04

[56] References Cited
UNITED STATES PATENTS

| 2,149,923 | 3/1939 | Martin | 43/34 |
| 3,081,572 | 3/1963 | Tomsello | 43/35 |
| 3,646,699 | 3/1972 | Zeman | 43/35 |
| 3,778,917 | 12/1973 | Peippo | 43/35 |

Primary Examiner—Warner H. Camp
Attorney, Agent, or Firm—Clarence A. O'Brien; Harvey B. Jacobson

[57] ABSTRACT

An artificial fishing bait having a body on which a jaw engaging hook is pivotally mounted for movement through substantially a 180 degree angle between a position adjacent the body and a position extending beyond a bait hook attached to the body. A latching mechanism, releasable by a pulling force exerted on the bait hook, normally retains the jaw engaging hook adjacent the body of the device against the bias of a torsion spring associated with the jaw engaging hook.

8 Claims, 8 Drawing Figures

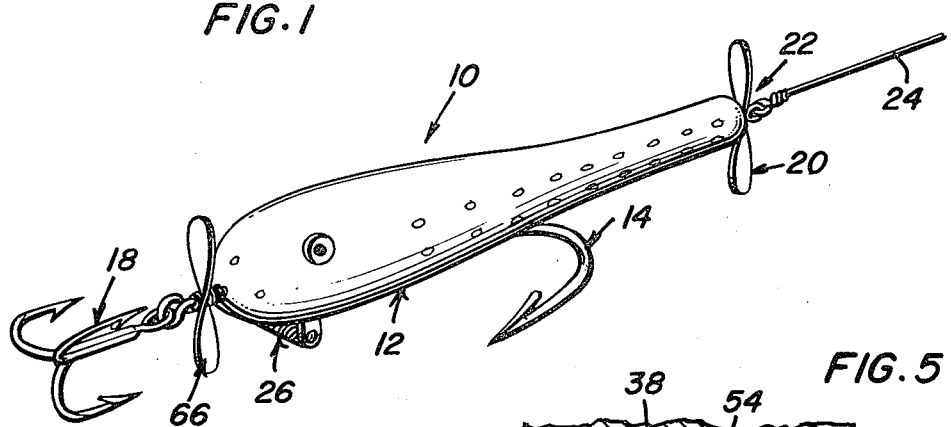
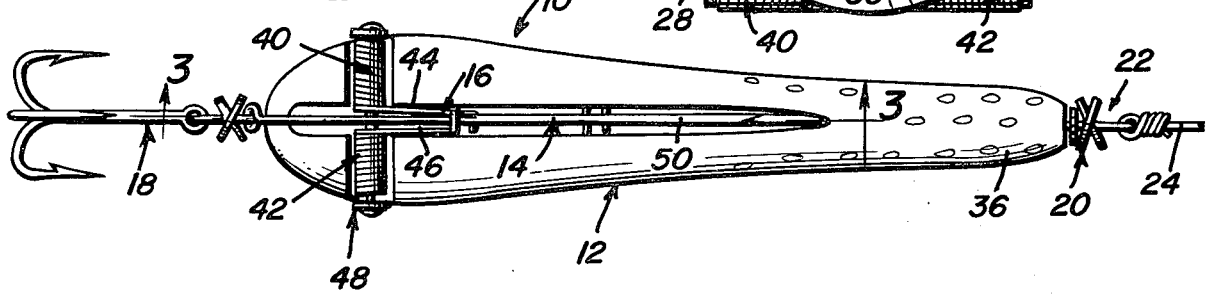
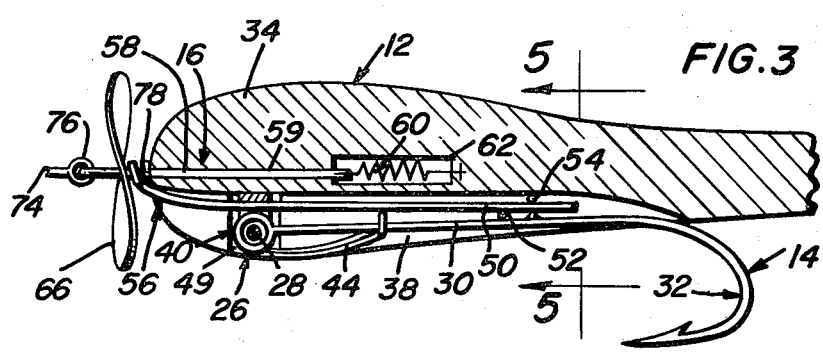
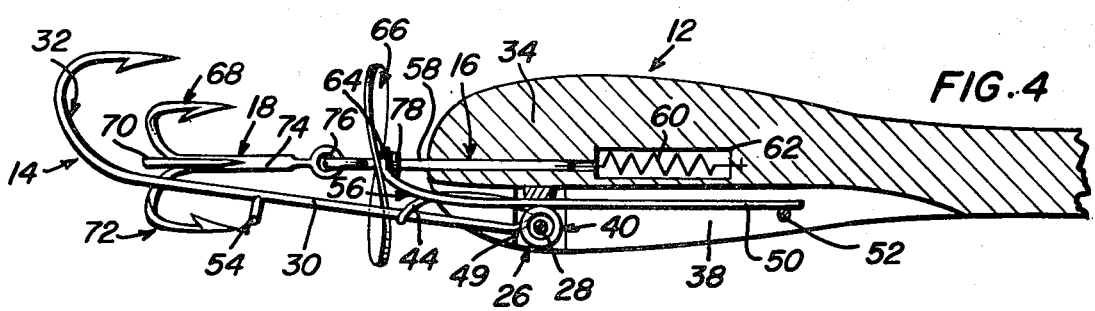

ARTIFICIAL FISHING BAIT

BACKGROUND OF THE INVENTION

1. Field of the Invention

This invention relates generally to an artificial fishing bait, or lure, and particularly to an artificial fishing bait of the kind which grips a fish in a positive manner when the fish bites at the device.

2. Description of the Prior Art

There is generally known to use artificial fishing bait which functions to grip in a positive manner a fish which strikes at the bait and is hooked by a bait hook forming part of the bait. When fishing for large fish, such as musky, the larger fish usually avoid being hooked by striking cautiously at the bait. Either the hook is only caught in the teeth of the larger fish, or the hook simply does not penetrate the hard mouth of the fish and the fish are able to throw the bait. Thus, as a general rule only the smaller fish are caught.

An example of artificial fishing bait provided with structure for positively gripping a fish which bites at the bait is shown in U.S. Pat. No. 2,134,841, issued Nov. 1, 1938 to W. Reese. A disadvantage to this known artificial fishing bait, however, is that the arrangement at the prongs is only effective to grip a fish when the fish has inserted the better portion of the bait into the mouth of the fish. Thus, a nibbling fish is still liable to avoid retention by the gripping hooks of the bait.

Other patents I am aware of which may be pertinent to the present invention are as follows:

U.S. Pat. No. 151,394 May 26, 1897
U.S. Pat. No. 969,014 Aug. 30, 1910
U.S. Pat. No. 1,217,690 Feb. 27, 1917
U.S. Pat. No. 1,268,097 June 4, 1918
U.S. Pat. No. 3,018,582 Jan. 30, 1962
U.S. Pat. No. 3,337,980 Aug. 29, 1967

SUMMARY OF THE INVENTION

It is an object of the present invention to provide an artificial fishing bait capable of securely gripping a fish even when the fish is only partially hooked on the bait hook of the artificial bait.

It is another object of the present invention to provide an artificial fishing bait capable of being used when casting and reeling both rapidly and slowly.

It is still another object of the present invention to provide an artificial fishing bait which will not trip or spring itself when casting normally, or which will tend to kill undersize fish.

These and other objects are achieved according to the present invention by providing an artificial fishing bait having: a body; a jaw engaging hook pivotally mounted on the body; a latching mechanism associated with the body for releasably engaging the jaw engaging hook and normally retaining the jaw engaging hook adjacent the body; and a bait hook connected to the latching mechanism for causing the latching mechanism to release the jaw engaging hook on application of a force to the bait hook.

According to a preferred construction of the present invention, a resilient element, advantageously in the form of a torsion spring, is associated with the jaw engaging hook for biasing the jaw engaging hook away from the body of the device.

According to an advantageous feature of the present invention, the jaw engaging hook is mounted on the body for pivotal movement through a substantially 180° angle. By providing the jaw engaging hook with a shank of sufficient length to extend beyond the bait hook when the jaw engaging hook is 180° from the retained position adjacent the body of the bait so as to permit the jaw engaging hook to grip a fish under the vulnerable part of the jaw of the fish and hold the fish securely.

The preferred construction of the body of the artificial fishing bait according to the invention includes a slot provided at a one longitudinally spaced end of the body, with the jaw engaging hook being pivotally mounted at the one end and normally partially disposed in the slot. The latching mechanism is also disposed in the slot and extends from the slot away from the one end of the body for attachment to the bait hook. Preferably, the latching mechanism includes a longitudinal latching bar mounted in the slot of the body for providing movement parallel to the longitudinal extent of the latching bar, and the body, with the jaw engaging hook including a ring provided on the shank of the hook for being normally engaged by the latching bar. A pin also advantageously mounted in the body of the bait at the one end thereof, with the bait hook and the extending end of the latching bar both being connected to the pin for effective connection to one another.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING

FIG. 1 is a perspective view showing an artificial fishing bait according to the present invention.

FIG. 2 is a bottom plan view showing the artificial fishing bait of FIG. 1.

FIG. 3 is a fragmentary, sectional view, taken generally along the line 3—3 of FIG. 2.

FIG. 4 is a fragmentary, sectional view, similar to FIG. 3, but showing the artificial fishing bait in its released, or fish-gripping, mode.

FIG. 5 is a fragmentary, sectional view taken generally along the line 5—5 of FIG. 3.

DESCRIPTION OF THE PREFERRED EMBODIMENTS

Referring now more particularly to FIGS. 1 and 2 of the drawing, an artificial fishing bait 10 according to the present invention includes a body 12 on which is pivotally mounted a jaw engaging hook 14. A latching mechanism 16 is mounted on body 12 for releasably engaging jaw engaging hook 14 and normally retaining hook 14 in a position adjacent body 12, as is shown in FIGS. 1 and 2. Connected to latching mechanism 16 is a conventional bait hook 18 arranged, in a manner to be described below, for causing latching mechanism 16 to release hook 14 by a force being applied to bait hook 18 as by biting fish (not shown).

A propeller 20 is advantageously, although not necessarily, attached to an end of body 12 spaced longitudinally from bait hook 18 in a conventional manner as by a standard eye-screw 22, which also facilitates attachment of body 12 of fishing bait 10 to a standard fishing line 24.

A resilient arrangement 26 is also provided on body 12 for biasing hook 14 away from the position shown in FIGS. 1 and 2 of the drawings wherein hook 12 is disposed adjacent to the body 12 and toward a fish jaw gripping position to be discussed below.

Referring now more particularly to FIGS. 3 through 5 of the drawings, a comparison of FIGS. 3 and 4 clearly shows how hook 14 is mounted on body 12 as by a shaft 28 for pivotal movement through a substantially 180 degree angle. Hook 14 advantageously includes a shank 30 of sufficient length to extend beyond base hook 18 when hook 14 is 180 degrees (FIG. 4) from the retained position (FIG. 3) adjacent body 12 and permitting hook 14 to grip a fish (not shown) under the vulnerable part of the jaw of the fish and hold the fish securely by the hook portion 32 of hook 14.

As mentioned above, body 12 is a longitudinal member, preferably configured to simulate a fish in the general manner illustrated, having a pair of longitudinally spaced ends 34 and 36 (FIG. 2) and provided with a longitudinal slot 38 at one longitudinally spaced end, specifically end 34. Hook 14 is pivotally mounted at end 34 and is normally pressure disposed in slot 38. Further, latching mechanism 16 is disposed in slot 38 and extends from the slot 38 and away from end 34 of body 12 for attachment to bait hook 18.

As can be readily appreciated from the drawings, the resilient arrangement 26 advantageously includes a pair of pressure wire springs 40 and 42 (FIG. 2), having the inner, or adjacent ends 44 and 46 (FIG. 2) connected to the shank 30 of hook 14 for exerting a bias on the hook 14. As will be appreciated, tension wire springs 40, 42 which are advantageously retained on shaft 28, will be arranged so as to exert the appropriate bias on hook 14 and cause the hook 14 to pivot from the position of hook 14 shown in FIG. 3 of the drawings to the position of hook 14 shown in FIG. 4 of the drawings. The provision of a generally U-shaped bracket 48 facilitates mounting of shaft 28 and spring 40, 42 on body 12. As can be seen from FIGS. 3 through 5 of the drawings, the web-portion of bracket 48 is secured to body 12, and more specifically to a transverse slot 49 provided in body 12 in a suitable manner, such as by screw fasteners (not shown), and shaft 28 is generally in the leg portions of bracket 48 in a manner well known.

Latching mechanism 16 advantageously includes a longitudinally extending locking bar 50 mounted in slot 38 of body 12 for sliding movement parallel to the longitudinal extent of both latching bar 50 and body 12 to guide the end of bar 50 spaced furtherest from end 34 of body 12, and from bait hook 18. Hook 14 includes a ring 54 provided on the shank 30 of hook 14, and bar 50 normally engages ring 54 with the end of bar 50 adjacent guide pin 52 in the normal mode of hook 14, perhaps best seen in FIG. 3. Bar 50 has a closed end 56 extending beyond end 34 of body 12 in the general direction of bait hook 18. A pin 58 is slidably mounted as in a bore 59 provided in end 34 of body 12, and may be resiliently biased as by the illustrated spring 60, which may be a coil tension spring, disposed in a suitable cavity 62 provided within body 12, and the extending end 56 of latching bar 50 and bait hook 18 are both connected to the portion of pin 58 extending from end 34 of body 12. As can be readily appreciated from the drawing, the use of tension spring 60 to bias pin 58, and thus bait hook 18, toward end 34 of body 12 is particularly advantageous in order to assure that pin 58 is only moved outwardly within bore 59 when a predetermined force is applied to bait hook 18. The pin 58 may be arranged in bore 59 so as to be only axially displaced under a predetermined force in other ways, however. For example, pin 58 may have a suitable force fit within bore 59 that will be only over-come by the appropriate force, or a suitable compression spring (not shown) may be disposed within cavity 62 to exert the appropriate bias on pin 58.

A propeller 66 is advantageously rotatably arranged on pin 58 in that portion of pin 58 arranged extending from body 12 even when pin 58 is in the position shown in FIG. 3 of the drawing. While such propellers are advantageous and commonly employed in attracting fish to a bait, or lure, it is to be understood that such propellers are not necessary to carry out the essence of the present invention.

Bait hook 18 is advantageously provided with the illustrated plurality of hook portions 68, 70, and 72, arranged on a common shank 74. Since such a triple or treble, hook arrangement is itself well known in the fishing art, it is to be clearly understood that the concept of the invention can be carried out with bait hooks or other configurations than that illustrated. Pin 58 includes an eye 78 disposed at the outermost, or free end of the pin 58, and it is this eye 76 that facilitates attachment of bait hook 18, and more particularly the common shank 14 thereof, to pin 58 in a pivotal manner which will provide the bait hook with an advantageous universal freedom of movement.

As will be appreciated from the above description and from the drawing, a fishing bait 10 according to the invention is provided with a jaw engaging hook 14 having a hook portion 32 mounted on a shank 30 a sufficient length to cause the hook portion 32 to engage the jaw of a large fish that is hooked, or partially hooked, on the bait hook 18 when the jaw engaging hook is released by triggering of the latching mechanism 16 under the force exerted on bait hook 18 by the fish. It is the force of the fish nibbling, or actually hooked on, bait hook 18 that causes pin 58 to be axially disposed outwardly in order to cause the latch portion 78 of pin 58 to draw latching bar 50 in the same axial direction as pin 58 has been moved and release latching bar 50 from ring 54 in order to permit hook 14 to pivot, under the influence of pressure springs 40 and 42, essentially 180° to the position shown in FIG. 4 of the drawing wherein the jaw of the fish will be securely gripped by the hook portion 32 of hook 14.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:
1. An artificial fishing bait, comprising, in combination:
  a. a body;
  b. a jaw engaging hook pivotally mounted on the body;
  c. latching means mounted on the body for releasably engaging the jaw engaging hook and normally retaining the jaw engaging hook adjacent the body; and
  d. bait hook means connected to the latching means for causing the latching means to release the jaw engaging hook when a predetermined force is applied to the bait hook means, the body being a longitudinally extending member having a pair of longitudinally spaced ends, with a longitudinal slot provided at one longitudinally spaced end and extending longitudinally along the longitudinal extent of the body, the jaw engaging hook being pivotally mounted at the one end of the body and normally partially disposed in the slot, and the latching means being disposed in the slot and extending from the slot away from the one end of the body for attachment to the bait hook means, the latching means including a longitudinally extending latching bar mounted in the slot of the body for sliding movement parallel to the longitudinal extent of the body, the jaw engaging hook including an apertured member provided on the shank of the jaw engaging hook, the bar normally engaging the apertured member, an end of the latching bar extending beyond the body, a pin slidably mounted in the body at the one end of the body, and the bait hook means and the extending end of the latching bar both being connected to the pin, with the pin being slidably moved under a predetermined force by the bait hook means, and the latching bar being slidably displaced by a sliding movement of the pin for disengagement from the apertured member.

2. An artificial fishing bait, comprising, in combination:
   a. body;
   b. a jaw engaging hook pivotally mounted on the body;
   c. latching means mounted on the body for releasably engaging the jaw engaging hook and normally retaining the jaw engaging hook adjacent the body; and
   d. bait hook means connected to the latching means for causing the latching means to release the jaw engaging hook when a predetermined force is applied to the bait hook means, resilient means biasing the jaw engaging hook away from the body, the jaw engaging hook being mounted on the body for pivotal movement through a substantially 180° angle, and the jaw engaging hook including a shank of sufficient length to extend beyond the bait hook means when the jaw engaging hook is substantially 180° from the retained position of the jaw engaging hook adjacent the body, and thereby permitting the jaw engaging hook to grip a fish under the vulnerable part of the jaw of the fish and hold the fish securely, the body being a longitudinally extending member having a pair of longitudinally spaced ends with a longitudinal slot provided at one longitudinally spaced end and extending longitudinally along the longitudinal extent of the body, the jaw engaging hook being pivotally mounted at the one end of the body and normally partially disposed in the slot, and the latching means being disposed in the slot and extending from the slot away from the one end of the body for attachment to the bait hook means, the latching means including a longitudinally extending latching bar mounted in the slot of the body for sliding movement parallel to the longitudinal extent of the latching bar and of the longitudinal extent of the body, the jaw engaging hook including a ring provided on the shank of the jaw engaging hook, the bar normally engaging the ring, an end of the latching bar extending beyond the body, a pin slidably mounted in the body at the one end of the body, and the bait hook means and the extending end of the latching bar both being connected to the pin, with the pin being slidably moved under a predetermined force by the bait hook means, and the latching bar being slidably displaced by a sliding movement of the pin.

3. A structure as defined in claim 2, wherein the bait hook means includes a plurality of hook portions mounted on a common shank, the pin including an eye at an outer free end of the pin, the common shank being pivotally attached to the eye of the pin.

4. An artificial bait, comprising, in combination:
   a. a body;
   b. a jaw engaging hook pivotally mounted on the body;
   c. latching means mounted on the body for releasably engaging the jaw engaging hook and normally retaining the jaw engaging hook adjacent the body; and
   d. bait hook means connected to the latching means for causing the latching means to release the jaw engaging hook when a predetermined force is applied to the bait hook means, the body being a longitudinally extending member having a pair of longitudinally spaced ends, with a longitudinal slot provided at one longitudinally spaced end and extending longitudinally along the longitudinal extent of the body, the jaw engaging hook being pivotally mounted at the one end of the body and normally partially disposed in the slot, and the latching means being disosed in the slot and extending from the slot away from the one end of the body for attachment to the bait hook means, the latching means including a longitudinally extending latching bar mounted in the slot of the body for sliding movement parallel to the longitudinal extent of the latching bar and of the longitudinal extent of the body, the jaw engaging hook including a ring provided on the shank of the jaw engaging hook, the bar normally engaging the ring, an end of the latching bar extending beyond the body, a pin slidably mounted in the body at the one end of the body, and the bait hook means and the extending end of the latching bar both being connected to the pin, with the pin being slidably moved under a predetermined force by the bait hook means, and the latching bar being slidably displaced by a sliding movement of the pin.

5. A structure as defined in claim 4, wherein the bait hook means includes a plurality of hook portions mounted on a common shank, the pin including an eye at an outer free end of the pin, the common shank being pivotally attached to the eye of the pin.

6. A structure as defined in claim 4, further includes resilient means biasing the jaw engaging hook away from the body.

7. A structure as defined in claim 4, wherein the jaw engaging hook is mounted on the body for pivotal movement through a substantially 180 degree angle, and the jaw engaging hook includes a shank of sufficient length to extend beyond the bait hook means when the jaw engaging hook is substantially 180° from the retained position of the jaw engaging hook adjacent the body, and thereby permitting the jaw engaging hook to grip a fish under the vulnerable part of the jaw of the fish and hold the fish securely.

8. A structure as defined in claim 1, wherein the jaw engaging hook is mounted on the body for pivotal movement through a substantially 180° angle, and the jaw engaging hook includes a shank of sufficient length to extend beyond the bait hook means when the jaw engaging hook is substantially 180° from the retained position of the jaw engaging hook adjacent the body, and thereby permitting the jaw engaging hook to grip a fish under the vulnerable part of the jaw of the fish and hold the fish securely.

* * * * *